US012715423B2

(12) United States Patent
Nitze-Nelson et al.

(10) Patent No.: US 12,715,423 B2
(45) Date of Patent: Aug. 25, 2026

(54) SYSTEMS AND METHODS FOR CHARGING AN ELECTRIC VEHICLE FROM MULTIPLE SOURCES

(71) Applicant: Scout Motors Inc., Tysons, VA (US)

(72) Inventors: Andre Nitze-Nelson, Tiburon, CA (US); John Geary Gregory, III, Clawson, MI (US); Jason Quint, Ann Arbor, MI (US)

(73) Assignee: Scout Motors Inc., Tysons, VA (US)

( * ) Notice: Subject to any disclaimer, the term of this patent is extended or adjusted under 35 U.S.C. 154(b) by 61 days.

(21) Appl. No.: 18/925,528

(22) Filed: Oct. 24, 2024

(65) Prior Publication Data

US 2026/0116370 A1 Apr. 30, 2026

(51) Int. Cl.

*B60L 50/62* (2019.01)
*B60K 6/26* (2007.10)
*B60K 6/40* (2007.10)
*B60L 53/20* (2019.01)
*B60W 20/13* (2016.01)
*B60W 50/14* (2020.01)

(52) U.S. Cl.

CPC ............... *B60W 20/13* (2016.01); *B60K 6/26* (2013.01); *B60K 6/40* (2013.01); *B60L 50/62* (2019.02); *B60L 53/20* (2019.02); *B60W 50/14* (2013.01); *B60L 2210/30* (2013.01); *B60Y 2200/92* (2013.01)

(58) Field of Classification Search

None

See application file for complete search history.

(56) References Cited

U.S. PATENT DOCUMENTS 12,233,847 B2 * 2/2025 Gao .......................... B60K 6/48
2015/0298569 A1 * 10/2015 Kosetsu .................. B60L 15/20 320/155
2017/0015208 A1 * 1/2017 Dunlap .................. B60L 50/15
2018/0029600 A1 * 2/2018 Sjodin .................... B60L 53/16
2021/0206290 A1 * 7/2021 Li .......................... B60L 58/14

(Continued)

OTHER PUBLICATIONS

International Searching Authority (ISA/EP). International Search Report and Written Opinion. PCT/US/2025/051807. Feb. 19, 2026. 15 pages.

*Primary Examiner* — James M Mcpherson
(74) *Attorney, Agent, or Firm* — Meunier Carlin & Curfman LLC

(57) ABSTRACT

A multi-source charging system for an electric vehicle. The multi-source charging system may include an electric prime mover configured to drive a wheel of the electric vehicle, a battery electrically connected to the electric prime mover and configured to receive DC electrical power for charging the battery, an on-board charger electrically connected to the battery and configured to supply first DC electrical power for charging the battery, a range extender electrically connected to the battery and configured to supply second DC electrical power to charge the battery, and a controller. The controller may be configured to determine a power allocation for charging the battery and operate the on-board charger and the range extender, based on the determined power allocation, to cause the on-board charger and the range extender to simultaneously provide power to charge the battery when the electric prime mover is not driving the wheel.

20 Claims, 8 Drawing Sheets

(56) References Cited

U.S. PATENT DOCUMENTS

| | | | | |
|---|---|---|---|---|
| 2022/0402354 | A1* | 12/2022 | Wang | B60K 15/00 |
| 2024/0116385 | A1* | 4/2024 | Salter | B60L 1/00 |
| 2024/0391349 | A1* | 11/2024 | Kydd | B60L 3/0046 |
| 2026/0027905 | A1* | 1/2026 | Shan | B60L 1/003 |

* cited by examiner

SYSTEMS AND METHODS FOR CHARGING AN ELECTRIC VEHICLE FROM MULTIPLE SOURCES

BACKGROUND

This disclosure relates to charging systems for batteries of electric vehicles. More specifically, the disclosure relates to multi-source battery charging systems for electric vehicles with load balancing among the various sources.

Generally, an "electric vehicle" (or, "EV") refers to any type of vehicle that includes an electric motor as a primary mover (e.g., source of propulsion). Accordingly, in some such implementations, the EV may be a battery electric vehicle (BEV), a hybrid electric vehicle (HEV), or a plug-in hybrid electric vehicle (PHEV). EVs are provided with charging systems for replenishing batteries depleted during operation of the vehicle. With BEVs and PHEVs, the charging system typically connects the EV with an external source of energy such as an electric wall charger or a charging station, referred to herein as electric vehicle supply equipment (EVSE), which recharge a depleted battery over time. In some instances, the battery of the EV may be partially charged during operation of the EV using on-board charging systems such as a regenerative braking system, and the like. However, such on-board systems cannot fully charge the EV or even supply enough power to continuously power the EV during operation. Hybrid vehicles (HEVs and PHEVs) operate in one mode where an electric motor is used as the prime mover of the vehicle, and in another mode an internal combustion engine (ICE) is the prime mover. The battery of an HEV is not charged using an EVSE, relying on on-board charging of its battery through regenerative braking, and the like. While a PHEV may utilize an EVSE, it also utilizes on-board charging through regenerative braking and the like. Both HEVs and PHEVs may also use the ICE for partially charging the batteries, but the ICE is always capable of being the prime mover of the HEV or PHEV.

The time to recharge an EV's battery depends not only on how depleted the battery is, but also the availability of an EVSE or the amount of power that can be supplied by the EVSE. In some instances, the EVSE may be "weak," meaning that it is limited in the amount of available current and/or voltage supplied to the EVSE. For example, a typical Level 1 AC home charger uses a standard 120-volt AC outlet (15-20 amp breaker), supplying around 1 kW of power continuously. It may require up to 40-50 hours to fully charge a completely depleted BEV battery using a Level 1 charger. More common in-home use is a Level 2 AC charger, which uses a 208/240-volt AC outlet (30-amp breaker). Level 2 charging typically supplies 7-19 kW (continuously) but may still require up to 10 hours to fully charge a completely depleted BEV. Commercial charging stations, also known as direct-current fast charger (DCFC) or Level 3 DC charging, are typically not practical for home charging as they use a 3-phase 480-volt AC outlet and deliver direct current (DC) to the vehicle. DCFCs require significantly more power than Level 2 chargers, usually around 125 amps, and are often not readily available.

Therefore, what is desired are on-board devices, systems and methods to fully charge an EV battery in a timely manner, where such devices, systems and methods work independently of or cooperatively (and adjustably) with EVSE.

SUMMARY

One implementation of the present disclosure is a multi-source charging system for an electric vehicle having a battery comprising a range extender (REX) and an on-board charger. The electric vehicle's only form of propulsion is an electric prime mover (i.e., an electric motor) supplied power by the battery during operation of the electric vehicle. The REX is comprised of an on-board internal combustion engine (ICE), and a generator. In some instances, the REX further comprises a converter. Typically, the ICE drives the generator, which produces AC power, which is converted to DC power by the converter and is used to charge the battery. In some instances; however, the generator may comprise a DC generator, thus the converter is not needed. Further comprising the multi-source charging system is the on-board charger in electrical communication with the battery. The on-board charger receives AC power from electric vehicle supply equipment (EVSE), converts it to DC power, and supplies it to the battery for charging. The REX and the on-board charger are controlled by a power management controller (PMC) to charge the battery, where the REX can supply all the power to the battery for charging, the on-board charger can supply all of the power to charge the battery, or the REX and the on-board charger can each provide a portion of the power for charging the battery. The PMC is in further communication with a user interface, wherein the user interface receive inputs that control the charging of the battery. The REX and the on-board charger, as controlled by the PMC, work independently of each other, or cooperatively with one another, to charge the battery. The REX is not connected to the drivetrain of the electric vehicle, thus the REX is not a prime mover for the electric vehicle and does not, and cannot, provide propulsion for the electric vehicle.

Another implementation of the present disclosure is a power management controller (PMC) for an electric vehicle, the PMC controller including: at least one processor; and memory having instructions stored thereon that, when executed by the at least one processor, cause the controller to: present a first graphical user interface (GUI) that includes a menu of functions associated with a range extender (REX) and an on-board charger for the electric vehicle to generate an operating mode for the REX and the on-board charger to charge a battery of the electric vehicle; receive an indication of at least one first user input associated with a selection of one or more of the functions from the menu; and control the REX and the on-board charger of the electric vehicle in accordance with the selected one or more functions to charge the battery of the electric vehicle.

In various aspects, the GUI can be displayed on a display integrated into the electric vehicle and/or displayed on a display of a remote computing device external to the PMC such as a smartphone, tablet, personal computer, or the like implemented via a software application.

In one instance, the GUI comprises a slider displayed on the display that allows the user to slidably select the amount of power to be supplied by the REX and/or the on-board charger for charging the battery of the electric vehicle. In some instances, the display may comprise a touchscreen for adjusting the slider.

In another instance, the GUI allows an input or a selection from the menu by the user for automatically controlling the REX and the on-board charger in accordance with the input or selection.

Another implementation of the present disclosure is a method of controlling charging of a battery of an electric vehicle having a multi-source charging system. The method including presenting a first graphical user interface (GUI) that includes a menu of functions associated with a range extender (REX) and an on-board charger for the electric vehicle to generate an operating mode for the REX and the on-board charger to charge a battery of the electric vehicle; receive an indication of at least one first user input associated with a selection of one or more of the functions from the menu; and control the REX and the on-board charger of the electric vehicle in accordance with the selected one or more functions to charge the battery of the electric vehicle.

In various aspects of the method, the GUI is displayed on a display integrated into the electric vehicle and/or displayed on a display of a remote computing device external to the PMC such as a smartphone, tablet, personal computer, or the like implemented via a software application.

In one instance of the method, the GUI comprises a slider displayed on the display that allows the user to slidably select the amount of power to be supplied by the REX and/or the on-board charger for charging the battery of the electric vehicle. In some instances, the display may comprise a touchscreen for adjusting the slider.

In another instance of the method, the GUI allows an input by the user or a selection from the menu for automatically controlling the REX and the on-board charger in accordance with the input or selection.

Yet another implementation of the present disclosure is an electric vehicle including a multi-source charging system for a battery of the electric vehicle. The multi-source charging system comprises a range extender (REX) and an on-board charger. The REX is comprised of an on-board internal combustion engine (ICE), a generator, and a converter. The ICE drives the generator, which produces AC power, which is converted to DC power by the converter and is used to charge the battery. Further comprising the multi-source charging system of the electric vehicle is the on-board charger in electrical communication with the battery. The on-board charger receives AC power from electric vehicle supply equipment (EVSE), converts it to DC power, and supplies it to the battery for charging. The REX and the on-board charger are controlled by a power management controller (PMC) of the electric vehicle to charge the battery, where the REX can supply all the power to the battery for charging, the on-board charger can supply all of the power to charge the battery, or the REX and the on-board charger can each provide a portion of the power for charging the battery. The PMC is in further communication with a user interface, wherein the user interface receives inputs that control the charging of the battery. The REX and the on-board charger, as controlled by the PMC, work independently of each other, or cooperatively with one another, to charge the battery. The REX is not connected to the drivetrain of the electric vehicle, thus the REX is not a prime mover for the electric vehicle.

Another implementation of the present disclosure includes a multi-source charging system for an electric vehicle. The multi-source charging system may include an electric prime mover configured to drive a wheel of the electric vehicle, a battery electrically connected to the electric prime mover and configured to receive DC electrical power for charging the battery, an on-board charger electrically connected to the battery and configured to supply first DC electrical power for charging the battery, a range extender electrically connected to the battery and configured to supply second DC electrical power to charge the battery, and a controller. The controller may include a processor and memory, the memory having instructions stored thereon that, when executed by the processor, cause the controller to determine a power allocation for charging the battery, wherein the power allocation includes a portion of the first DC electrical power and a portion of the second DC electrical power, and operate the on-board charger and the range extender, based on the determined power allocation, to cause the on-board charger and the range extender to simultaneously provide power to charge the battery when the electric prime mover is not driving the wheel.

In some embodiments, the range extender comprises an internal combustion engine and an electrical generator. In some embodiments, the electrical generator is a DC electrical generator, and wherein the DC electrical generator generates the second DC electrical power for charging the battery. In some embodiments, the range extender comprises an internal combustion engine, an AC electrical generator, and an electrical converter configured to convert AC power generated by the AC electrical generator into the second DC electrical power for charging the battery. In some embodiments, the instructions further cause the controller to receive user input corresponding to a desired power allocation, and wherein determining the power allocation includes setting the power allocation to the desired power allocation. In some embodiments, the user input is received from either (i) a smartphone or (ii) a display integrated into the electric vehicle. In some embodiments, the multi-source charging system includes a display configured to present a graphical user interface (GUI) to a user and receive input therefrom, and wherein the instructions further cause the controller to cause the display to display the GUI comprising a slider for selecting a desired power allocation.

Another implementation of the present disclosure includes an electric vehicle including a wheel, an electric prime mover configured to drive the wheel, a battery electrically connected to the electric prime mover and configured to receive DC electrical power for charging the battery, an on-board charger electrically connected to the battery and configured to supply first DC electrical power for charging the battery, a range extender electrically connected to the battery and configured to supply second DC electrical power for charging the battery, a display configured to display a graphical user interface (GUI) for selecting a desired power allocation, and a controller. The controller may include a processor and memory, the memory having instructions stored thereon that, when executed by the processor, cause the controller to receive context data, determine a power allocation for charging the battery based on the context data and the desired power allocation, wherein the power allocation includes a portion of the first DC electrical power and a portion of the second DC electrical power, and operate the on-board charger and the range extender, based on the determined power allocation, to cause the on-board charger and the range extender to simultaneously provide power to charge the battery when the electric prime mover is not driving the wheel.

In some embodiments, the range extender comprises an internal combustion engine and an electrical generator. In some embodiments, the electrical generator is a DC electrical generator, and wherein the DC electrical generator generates the second DC electrical power for charging the battery. In some embodiments, the range extender comprises an internal combustion engine, an AC electrical generator, and an electrical converter configured to convert AC power generated by the AC electrical generator into the second DC electrical power for charging the battery. In some embodiments, the GUI includes a slider for selecting the desired power allocation. In some embodiments, the context data includes a charging capacity of an electric vehicle charger external to the electric vehicle. In some embodiments, the context data includes information describing a price of electricity sourced from the electric vehicle charger. In some embodiments, the context data includes information describing a physical location of the electric vehicle. In some embodiments, the instructions further cause the controller to determine, based on the information describing the physical location of the electric vehicle, whether the range extender can be safely operated. In some embodiments, the information describing the physical location of the electric vehicle includes at least one of (i) global positioning system (GPS) data or (ii) proximity sensor data.

Another implementation of the present disclosure includes a power management controller for an electric vehicle, the power management controller comprising a processing circuit comprising a processor and memory, the memory having instructions stored thereon that, when executed by the processor, cause the power management controller to determine whether an external power source is connected to the electric vehicle, determine a current charge level of a battery of the electric vehicle, cause a display to display a graphical user interface (GUI) comprising (i) a slider for selecting a desired power allocation and (ii) an indication of the current charge level, receive context data, determine, based on the desired power allocation and the context data, a power allocation for charging the battery, and operate an on-board charger of the electric vehicle and a range extender of the electric vehicle, based on the determined power allocation, to cause the on-board charger and the range extender to simultaneously provide power to charge the battery.

In some embodiments, the context data includes at least one of (i) information describing a price of electricity sourced from the external power source, (ii) information describing a charging capacity of the external power source, or (iii) information describing a physical location of the electric vehicle. In some embodiments, the instructions further cause the power management controller to determine, based on the information describing the physical location of the electric vehicle, whether the range extender can be safely operated.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF DRAWINGS

The disclosed methods, apparatuses, and systems are explained in even greater detail in the following drawings. The drawings are merely exemplary and certain features may be used singularly or in combination with other features. The drawings are not necessarily drawn to scale.

DETAILED DESCRIPTION

Following below are more detailed descriptions of concepts related to, and implementations of, methods, apparatuses, and systems for charging the high-voltage battery of an electric vehicle. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As used herein the term “electric vehicle” (EV) refers to any type of vehicle that includes an electric motor as a primary mover (e.g., source of propulsion). In some implementations, the EV may be a battery electric vehicle (BEV), a hybrid electric vehicle (HEV), or a plug-in hybrid electric vehicle (PHEV). In some implementations no fossil fuels are utilized, no internal combustion engine is used as a prime mover in the vehicle, and no alternative forms of propulsion is provided (e.g., hydrogen fuel cells, etc.). As used herein, “propulsion” means the action of driving or movement of the vehicle where said movement is caused by a prime mover of the vehicle. In some implementations, features of this disclosure can be used with plug-in hybrid vehicles, hybrid vehicles (e.g., full hybrid vehicles), mild hybrid electric vehicles, and range extended hybrid vehicles.

Figure 1:
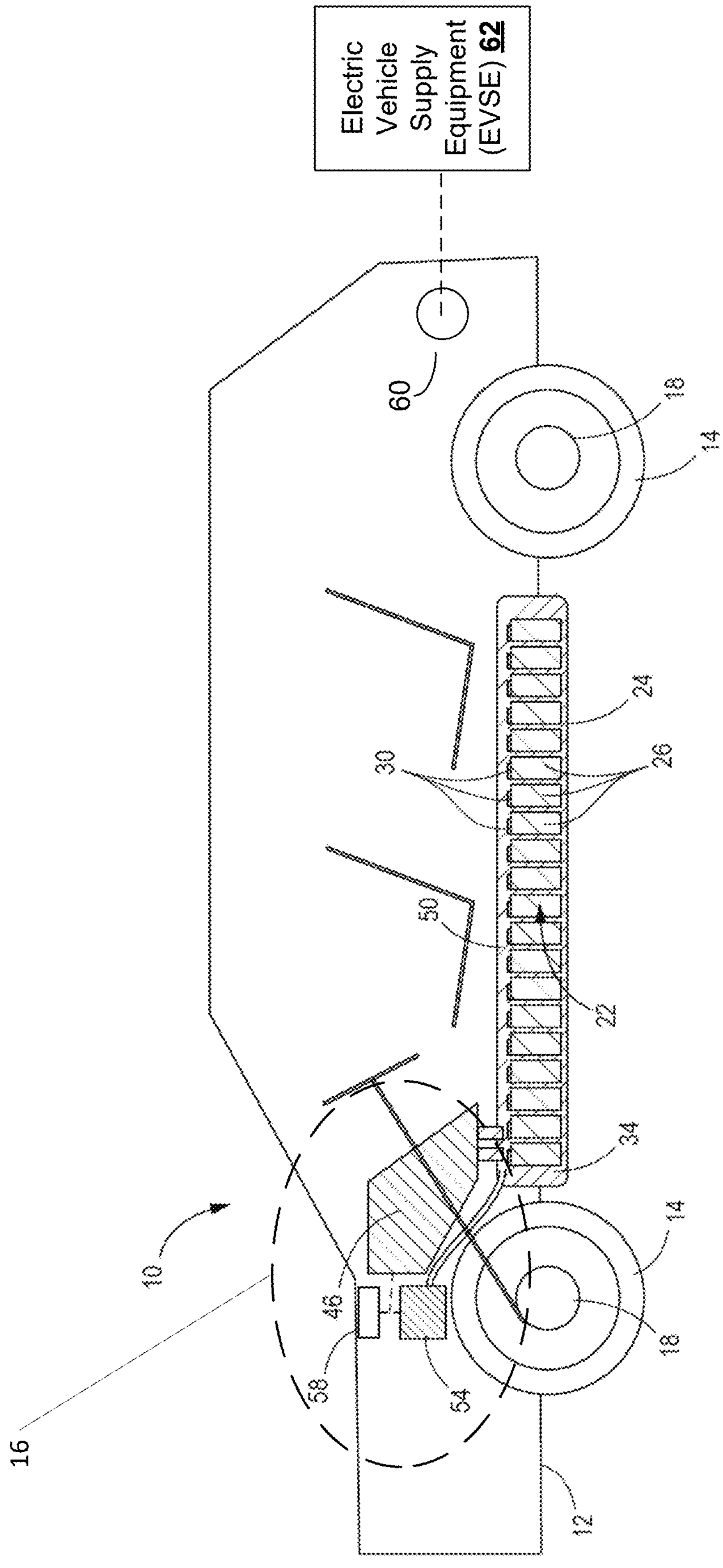
FIG. 1 is a schematic representation of a battery electric vehicle including a multi-source charging system for charging the battery of the electric vehicle, according to some implementations.

As shown in FIG. 1, an electric vehicle 10 includes a frame or chassis 12 (e.g., a truck frame, a unibody constructed chassis, etc.) and four wheels 14. At least one of wheels 14 is driven by an electric machine (e.g., an electric motor). In the illustrated example, electric vehicle 10 includes multiple electric machines 18 each driving a corresponding one of wheels 14. For example, electric vehicle 10 may include two of electric machines 18—one coupled to each of a front and rear axle, respectively—making electric vehicle 10 an “all-wheel drive” or “four-wheel drive” vehicle. However, it should be appreciated that electric vehicle 10 can include one, two, three, or more electric machines for driving one or more of wheels 14; thus, the present disclosure is not limiting in this regard.

A battery system 22—sometimes referred to a high-voltage battery assembly or traction battery—is supported within a battery housing 24 that is secured to the chassis 12. The battery system 22 includes battery cells 26 positioned within the battery housing 24. In some implementations, the battery cells 26 are cylindrical type cells. In some implementations, the battery cells 26 are prismatic or another battery cell geometry. Each of the battery cells 26 includes poles 30 (e.g., a positive pole and a negative pole) connected by busbars.

As shown in FIG. 1, the electric vehicle 10 includes a multi-source charging system 16 (components shown substantially within the dashed oval in FIG. 1). The multi-source charging system 16 includes at least a range extender (REX) 46, an on-board charger 54, and a power management controller (PMC) 58. Though not explicitly shown in FIG. 1, the REX 46 may include an on-board internal combustion engine (ICE), a generator, and/or a converter. In some embodiments, the ICE drives the generator, which produces AC power, which is converted to DC power by the converter and is used to charge the battery 22. In some embodiments, the generator may include a DC generator and no converter. The REX 46 may (i) charge the battery 22 and/or (ii) provide power (e.g., in the form of electrical energy, mechanical energy, etc.) to one or more motors (e.g., the electric machines 18, etc.). In some embodiments, both the REX 46 and the battery 22 provide power to the motors (e.g., in series, in parallel, etc.). Conventional electric vehicles may not include a range extender. Therefore, electric vehicle 10 may offer performance improvements compared with conventional electric vehicles because electric vehicle 10 may power the electric machines 18 via the battery 22 and/or the REX 46. The ICE may have a horsepower rating of between 30 and 180 horsepower. It may run on various fuels, including gasoline, diesel, and/or the like. Not shown in FIG. 1 is a fuel tank to hold the fuel for the ICE. Multi-source charging system 16 may include the on-board charger 54 in electrical communication with the battery 22 for supplying DC power to the battery 206 for charging the battery 206. The on-board charger 54 receives AC power via charge port 60 from electric vehicle supply equipment (EVSE) 62, converts the AC power to DC power, and supplies the DC power to the battery 22 (e.g., to charge the battery 22, etc.). In some embodiments, on-board charger 54, or one or more components thereof, are positioned in a different portion of the electric vehicle 10 than shown in FIG. 1 (e.g., in a rear of electric vehicle 10, etc.). The REX 46 and the on-board charger 54 are controlled by the PMC 58 to charge the battery 22, where the REX 46 can supply all the power to the battery 22 for charging, the on-board charger 54 (when connected to EVSE) can supply all of the power to charge the battery 22, or the REX 46 and the on-board charger 54 can each provide a portion of the power for charging the battery 22. The PMC 58 is in further communication with a user interface, wherein the user interface receives inputs that control the charging of the battery 22. The REX 46 and the on-board charger 54, as controlled by the PMC 58, work independently of each other, or cooperatively with one another, to charge the battery 22. It is to be appreciated that the internal combustion engine of the REX 46 is not connected to the drivetrain of the electric vehicle 10, thus the internal combustion engine of the REX 46 is not and cannot be a prime mover for the electric vehicle 10 and does not provide any propulsion for the vehicle.

Figure 2:
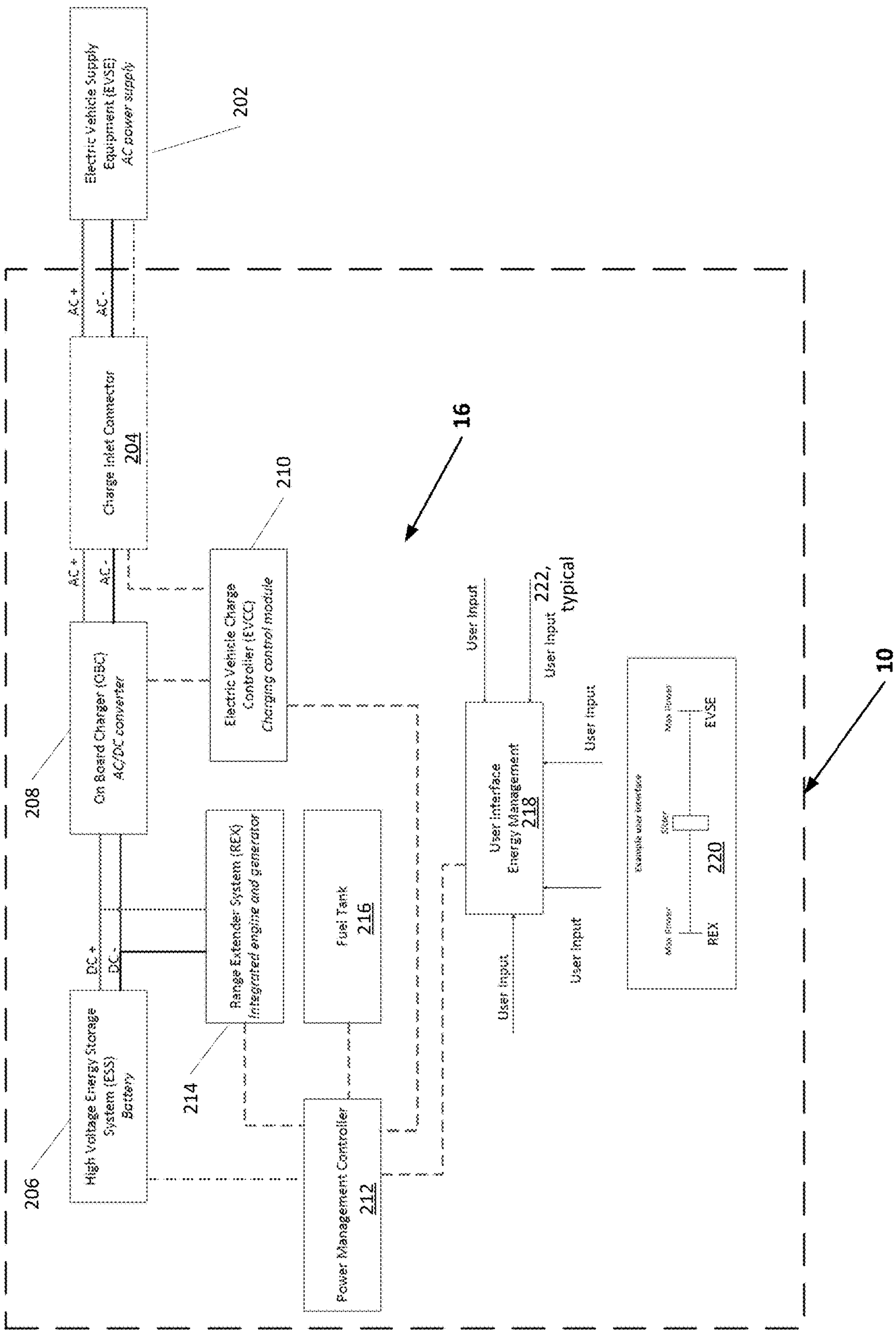
FIG. 2 is a simplified schematic of the multi-source charging system for an electric vehicle, according to some implementations.

FIG. 2 illustrates a simplified schematic of a multi-source charging system 16 for an electric vehicle 10. As shown in FIG. 2, in a typical configuration an EVSE 202, such as a home charging station (Level 1 or Level 2), a commercial charging station, or the like, is used to supply AC power to the electric vehicle 10 through a charge inlet connector 204. Though not shown in FIG. 2, it should be appreciated that some commercial charging stations provide DC power to the electric vehicle 10, in which case the input DC power would be routed to a DC/DC converter (to step it up/down to the desired voltage, not shown), and then to the battery 206 for charging, or the input DC power would be converted to AC power through a DC to AC inverter (not shown), and then the converted AC power is routed to the on board charger (OBC) 208, where it is converted back to DC power (at the desired voltage level) and used to charge the battery 206. In some embodiments, DC power supplied by a commercial charging station supplies the battery 206 directly. Referring back to the typical configuration shown in FIG. 2, where the EVSE 202 supplies AC power to the electric vehicle 10 through the electric vehicle's charge inlet connector 204, the provided AC power is converted to DC power by the OBC 208 at the desired voltage level and used to charge the battery 206. For example, the OBC 208 may output DC power in a range of 200-800 volts to charge the battery 206. The OBC 208 is controlled and/or monitored by an electric vehicle charge controller (EVCC) 210. The EVCC 210 provides charge control parameters to the OBC 208 such as the amount of power that the OBC 208 provides to the batteries for charging, voltage levels, etc. In some instances, the EVCC 210 may monitor the performance of the OBC 208 to ensure it is working correctly and in accordance with the control signals sent to it. In some instances, the EVCC 210 may monitor the voltage level of the power supplied to the charge inlet connector 204 by the EVSE 202. In some instances, the EVCC 210 may preclude charging the battery 206 with the OBC 208 if the power supplied by the EVSE 202 is not within certain ranges. For example, the EVCC 210 may preclude charging the battery 206 if the power supplied by the EVSE 202 is not within 5% of the nominal AC supply voltage (e.g., for L1/L2 charging, etc.). As another example, the EVCC 210 may preclude charging the battery 206 if the power supplied by the EVSE 202 is above 500 volts. The EVCC 210 may, in some instances, change the routing of the power from the EVSE 202 by determining whether the EVSE 202 is supplying AC or DC power.

The EVCC 210 is in communication with the PMC 212. In some instances, the EVCC 210 may be integrated into the PMC 212, where the EVCC 210 and the PMC 212 may share common processors and/or memory components, or the EVCC 210 may be separate from the PMC 212, each having their own processors and/or memory. Similarly, the EVCC 210 may be integrated into the OBC 208, where the EVCC 210 and the OBC 208 may share common processors and/or memory components, or the EVCC 210 may be separate from the OBC 212, each having their own processors and/or memory. As noted herein, in some instances, the PMC 212 and/or the EVCC 210 and/or the OBC 212 may be part of the vehicle control system for the electric vehicle 10, as modern vehicles often include multiple computing devices or systems—commonly referred to as "electronic control units" or ECUs—that control the operations of the vehicle and the systems therein. For example, a conventional internal combustion engine (ICE) vehicle may include one or more of an engine control module (ECM), powertrain control module (PCM), transmission control module (TCM), brake control module (BCM or EBCM), central control module (CCM), central timing module (CTM), general electronic module (GEM), body control module (BCM), and suspension control module (SCM). Instead of an ECM and TCM, electric vehicles (EVs) may include a vehicle control unit (VCU), a motor control unit (MCU), and/or other types of computing devices.

The PMC 212 performs several functions including monitoring a state of charge of the battery 206, controlling the range extender system (REX) 214 and monitoring the fuel level in its fuel tank 216, and working cooperatively with the EVCC 210 to allocate charging of the battery 206 between the REX 214 and the OBC 208, where the REX 214 may supply all the power to charge the battery 206 (and the OBC 208 supplies none); alternatively, the OBC 208 may provide all the power to charge the battery 206 (and the REX 214 supplies none); or, both the REX 214 and the OBC supply power to charge the battery 206. It is to be noted that the OBC 208 is supplied power from the charge inlet connector 204 and not only converts that power to DC power (if needed), but also controls the amount of DC power supplied to the battery 206 for charging the battery, including voltage levels, current levels, and total power supplied (kWs). Controls signals are provided to the OBC 208 via the EVCC 210, which is in communication with the PMC 212.

As noted herein, the REX 214 is comprised of an internal combustion engine (ICE), which drives a generator. While the generator of the REX 214 is typically an AC generator, further requiring a convertor to convert the generated AC power to DC power to charge the battery 206, it is to be appreciated that in some instances the generator of the REX 214 may comprise a DC generator, thus not requiring an AC to DC converter. The PMC 212 may, in some instances, monitor the fuel level of a fuel tank 216 of the REX 214 and provide an indication of fuel level, including providing an alarm or otherwise provide an indication that the fuel level is low, and/or, working cooperatively with the EVCC 210, automatically causing the multi-source charging system 16 to switch entirely to charging the battery 206 using the OBC 208 if the fuel tank 216 is empty or nearly empty. In short, the PMC 212 controls how much power is supplied by the REX 214 to charge the battery 206, and how much power is supplied by the OBC 208 to charge the battery 206 (where the PMC 212 works cooperatively with the EVCC 210 to control the OBC 208).

The PMC 212 is in further communication with a user interface 218 that is used for energy management of the multi-source charging system 16. In some instances, the user interface 218 provides a graphical user interface (GUI) that not only allows monitoring operation of all or a portion of the multi-source charging system 16, but that also provides a user with the ability to control the multi-source charging system 16 based on user inputs 222. For example, the user interface 218 may display information such as fuel level of the fuel tank 216, the state of charge of the battery 206, how much power is supplied by the REX 214 to charge the battery 206, and how much power is supplied by the OBC 208 to charge the battery 206, the range of the electric vehicle 10 based on the state of charge of the battery 206, and other information about the multi-source charging system 16 and/or the electric vehicle 10. The information may be displayed graphically using the GUI of the user interface and/or textually.

As noted herein, the PMC 212 comprises one or more processors and memory having instructions stored thereon that, when executed by the one or more processors, cause the PMC 212 to present the GUI that includes a menu of functions associated with the REX 214 and the OBC 208 for the electric vehicle 10 to generate an operating mode for the REX 214 and the OBC 208 to charge the battery 206 of the electric vehicle 10; receive an indication of at least one first user input associated with a selection of one or more of the functions from the menu; and control the REX 214 and the OBC 208 of the electric vehicle 10 in accordance with the selected one or more functions to charge the battery 206 of the electric vehicle 10. In some instances, the GUI is displayed on a display integrated into the electric vehicle 10. In other instances, the GUI is displayed on a display of a remote computing device external to the PMC 212 (and the electric vehicle 10) such as a smartphone, tablet, personal computer, or the like, implemented via a software application. The GUI allows the user to manually select how much power is supplied by the REX 214 to charge the battery 206, and how much power is supplied by the OBC 208 to charge the battery 206. In some instances, the GUI comprises a slider 220 displayed on the display that allows the user to slidably select the amount of power to be supplied by the REX 214 and/or the OBC 208 for charging the battery 206 of the electric vehicle 10; however, it should be appreciated that the GUI may comprise various other elements for receiving user inputs, such as text boxes, a menu, etc. In some instances, the display may comprise a touch-screen display for adjusting the slider 220. In other instances, the slider 220 may comprise an actual physical sliding control, such as a rheostat-type device.

Alternatively or optionally, the GUI may allow an input or a selection from the menu by the user for automatically controlling the REX 214 and/or the OBC 208 in accordance with the input or selection. A non-exhaustive list of such inputs may include, for example, a destination (the multi-source charging system 16 determines an optimal charging schedule for the battery 206 so that the vehicle will have the range to travel to the destination (and optionally, back from the destination to a "home" location)); a time to achieve the desired charging of the battery 206 (for example, a user input may be that the user wants the battery 206 to be 100% charged by 6:00 am the following morning); time of day/cost-based charging thresholds; fuel consumption target usage of the REX 214 and fuel reserves (for example, the input can indicate that the user does not want to have less than a half of a tank of fuel when the charging of the battery 206 is complete or the desired level of charge is achieved); a state of charge (e.g., a current charge level of the battery 206); an allocated power (e.g., an average amount of power required over a time period); a max power (e.g., a maximum required power over a time period); a power allocation (e.g., what percentage of supplied power comes from the REX 214 versus the EVSE 202); a fuel consumption target usage (e.g., a user may select a desired fuel consumption and electric vehicle 10 may operate REX 214 based on the desired fuel consumption); a fuel reserve (e.g., a user may select a desired fuel reserve and electric vehicle 10 may wait for confirmation from a user before enabling the REX 214 once a current fuel level is at or below the fuel reserve level); a time to run associated with the REX 214 (e.g., a user may select a time period during which the REX 214 may be turned on); and/or a schedule.

The one or more processors of the PMC 212 execute software algorithms to charge the battery 206 in accordance with the inputs using one or both of the REX 214 and the OBC 208. In some instances, historical information about the electric vehicle 10 stored in a memory may be accessed by the PMC 212 to make determinations about the charging schedule of the battery 206. For example, historical information may include (i) the actual depletion rate of the battery 206 when the electric vehicle 10 is being operated and/or (ii) the average unplug time (e.g., the amount of time the electric vehicle 10 has not been charging averaged over a time period). As another example, characteristics of the charging schedule (e.g., the maximum charging current, etc.) of the battery 206 may be limited based on past usage, battery state of health, and/or other internal metrics. In FIG. 2 control and monitoring signals are shown in dashed lines. It is to be appreciated that such control and monitoring can be implemented through electrically conductive control wiring, optically through fiber-optic connections, wirelessly, or any combination of these.

Figure 3A:
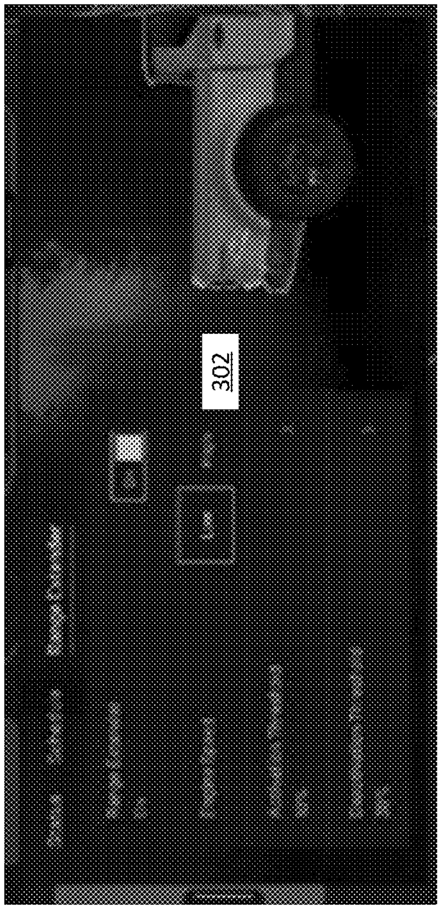
FIGS. 3A-3D are non-limiting examples of GUIs for displaying information about a multi-source charging system for an electric vehicle and for receiving inputs for controlling the multi-source charging system, according to some implementations.
Figure 3A:
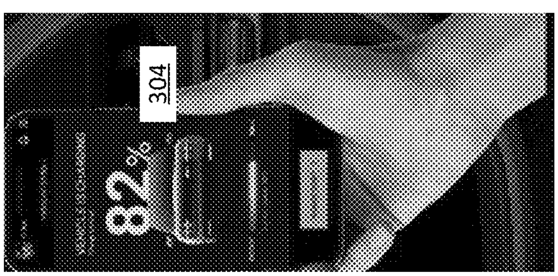
Figure 3B:
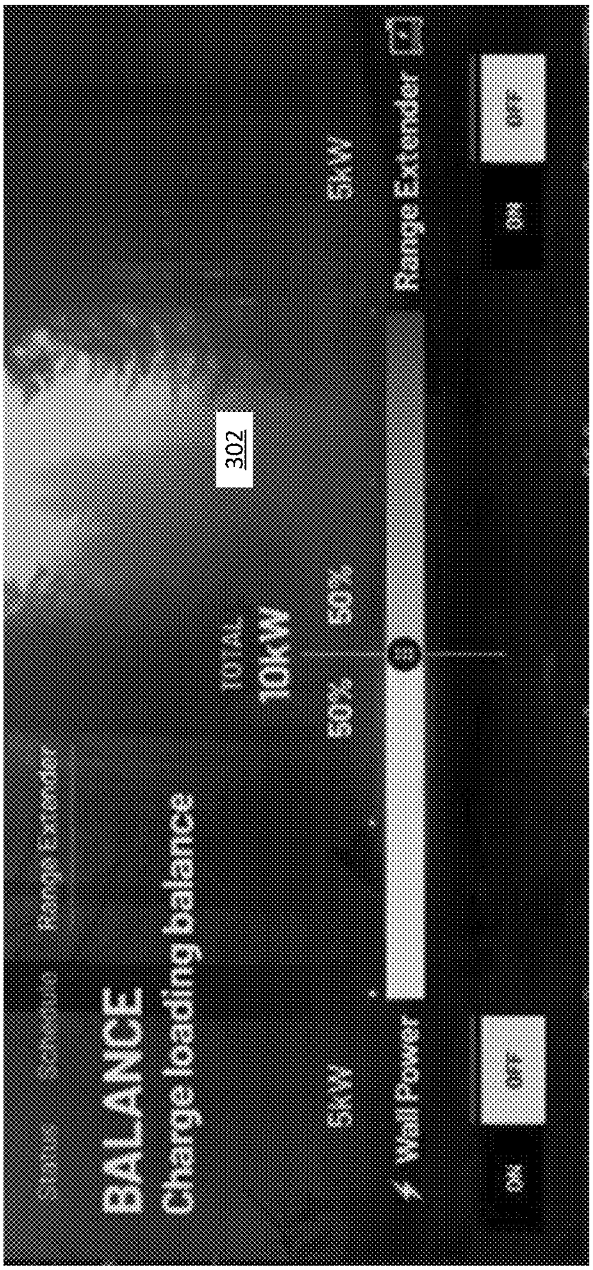
Figure 3C:
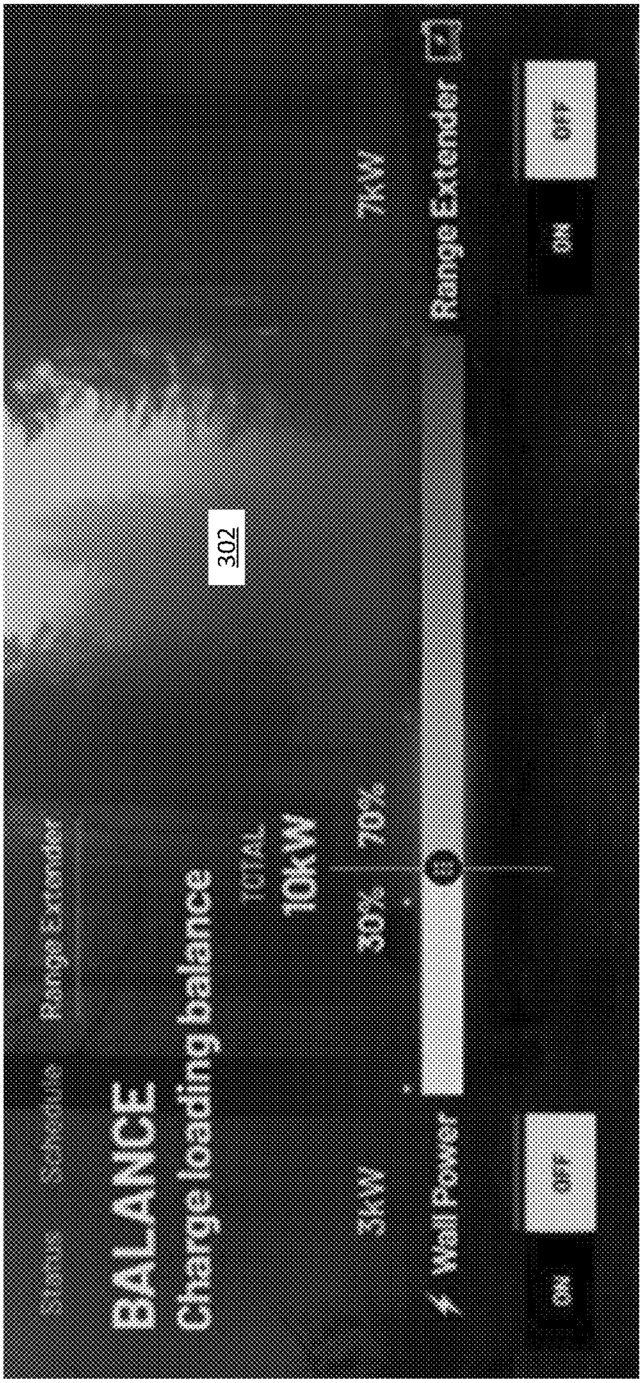
Figure 3D:
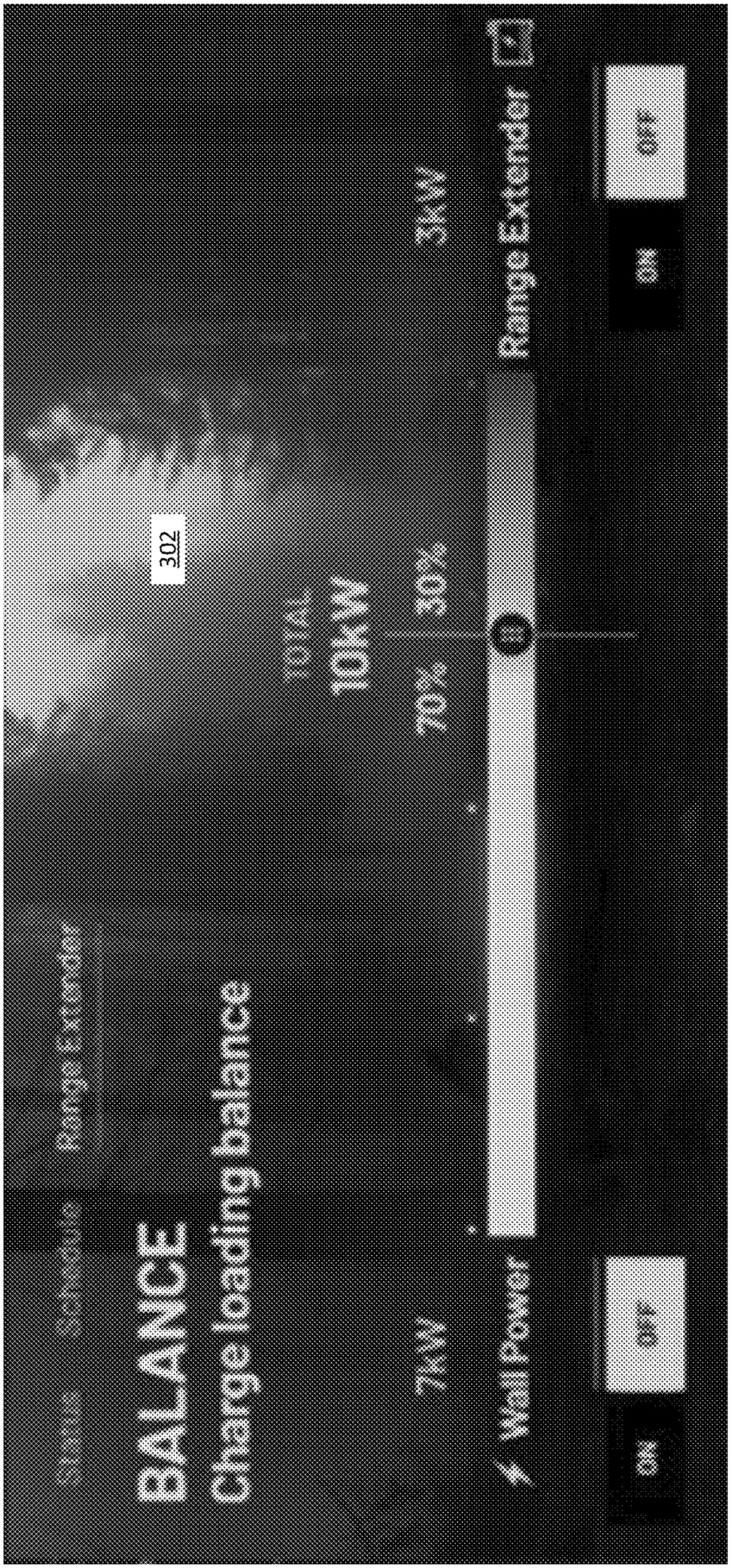

FIGS. 3A-3D are non-limiting examples of GUIs for displaying information about the multi-source charging system 16 and receiving inputs for controlling the multi-source charging system 16. FIG. 3A illustrates the GUI displayed on a display 302 integrated into the electric vehicle 10 and also on a display of a remote computing device 304 (e.g., a smartphone). As shown in FIGS. 3B-3D, the "wall power" (i.e., power supplied to the electric vehicle 10 from the EVSE 202 to the battery 206 through the OBC 208) and the REX 214 can be selectively chosen as "On" or "Off," and the amount of power supplied to the battery 206 by either the REX 214 or the "wall power" can be selected. The total amount of power being supplied to the battery 206 from the combination of all sources, for example 10 kW, is also displayed. For clarity, in FIG. 3B 10 kW of power is being supplied to the battery 206 with 50% of that 10 kW (5 kW, as shown on the display 302) being supplied by the "wall power" and the other 50% of that 10 kW (5 kW, as shown on the display 302) being supplied by the REX 214. FIGS. 3C and 3D show 10 kW (total) being supplied to the battery 206, but it has been slidably adjusted using the touch screen of the display 302 such that in FIG. 3C 30% of that 10 kW (3 kW, as shown on the display 302) being supplied by the "wall power" and the other 70% of that 10 kW (7 kW, as shown on the display 302) being supplied by the REX 214, and in FIG. 3D, 70% of that 10 kW (7 kW, as shown on the display 302) being supplied by the "wall power" and the other 30% of that 10 kW (3 kW, as shown on the display 302) being supplied by the REX 214. It is to be appreciated that the displays and GUIs shown in FIGS. 3A-3D are only examples of various implementations of displays and GUIs that can be used in implementations of the embodiments described herein and that other displays and/or GUIs that are not shown may be used in such implementations.

Figure 4:
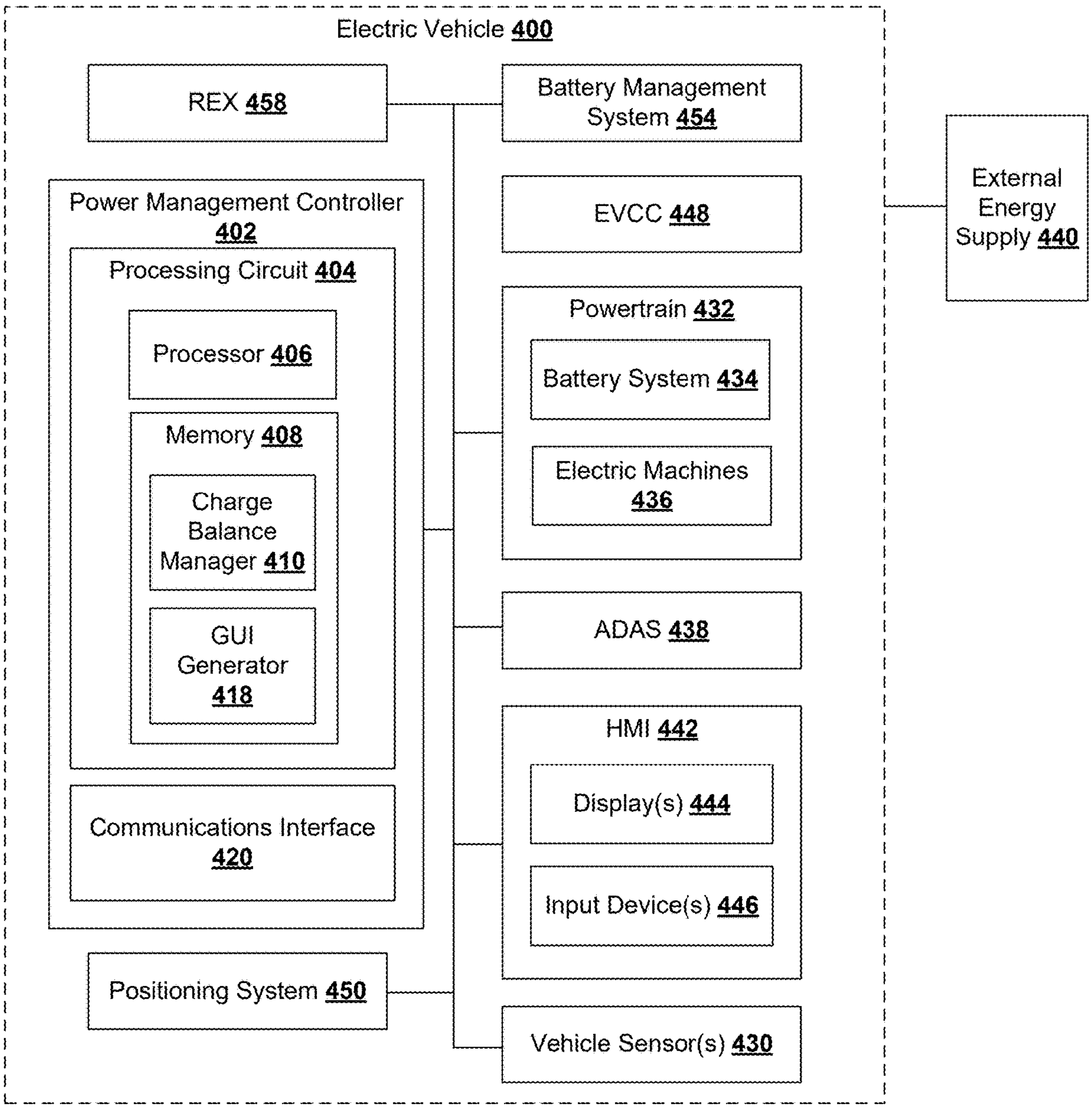
FIG. 4 illustrates a block diagram of an exemplary vehicle control system, according to some implementations.

Referring now to FIG. 4, a block diagram of an electric vehicle 400 is shown, according to an embodiment. In some embodiments, the electric vehicle 400 is the same as the electric vehicle 10. The electric vehicle 400 may include power management controller 402, vehicle sensor(s) 430, powertrain 432, ADAS 438, HMI 442, EVCC 448, positioning system 450, battery management system 454, and/or REX 458. In various embodiments, the electric vehicle 400 is electrically connected to external energy supply 440. In various embodiments, external energy supply 440 is similar to or the same as EVSE 202. For example, external energy supply 440 may connect to electric vehicle 400 via an on-board charger as described with reference to FIG. 2 (e.g., where external energy supply 400 provides power to the on-board charger and the on-board charger provides power to battery system 434.

In various embodiments, power management controller 402 controls charging of the battery system 434. For example, power management controller 402 may receive a user input, determine an amount of power from external energy supply 440 to use to charge battery system 434, determine an amount of power from REX 458 to use to charge battery system 434, and charge battery system 434 based on the determined power amounts. As a further example, power management controller 402 may charge battery system 434 using only power from REX 458, only power from external energy supply 440, and/or using a combination of power from REX 458 and external energy supply 440. In some embodiments, power management controller 402 determines a charging protocol for battery system 434 based on user input. For example, power management controller 402 may receive a user input indicating that battery system 434 should be charged using equal amounts of power from REX 458 and external energy supply 440. Additionally or alternatively, power management controller 402 may determine the charging protocol dynamically. For example, power management controller 402 may receive a fuel level from vehicle sensor(s) 430 and determine an amount of power to use from REX 458 based on the fuel level. In various embodiments, power management controller 402 receives one or more inputs from sensors (e.g., vehicle sensor(s) 430, etc.) and determines a charging protocol based on the one or more inputs. For example, power management controller 402 may receive a carbon monoxide measurement from a carbon monoxide sensor and adjust operation of REX 458 based on determining that the carbon monoxide measurement exceeds a threshold (e.g., to reduce a power output of REX 458, etc.). In some embodiments, power management controller 402 receives one or more inputs from an external source and adjusts the operation of REX 458 based on the one or more inputs. For example, power management controller 402 may receive electrical demand information (e.g., a price of electricity) from an external source (e.g., a server, etc.) and adjust operation of REX 458 based on the electrical demand information indicating that a price of electricity exceeds a cost associated with generating electricity using REX 458. As a further example, power management controller 402 may receive an indication of a maximum power output associated with an external energy source (e.g., external energy supply 440, etc.) and may adjust an operation of REX 458 based on the indication (e.g., by operating REX 458 to generate additional power to charge battery system 434, etc.). In various embodiments, power management controller 402 is similar to or the same as multi-source charging system 16.

While illustrated as a single and distinct component of vehicle 400, it should be appreciated that power management controller 402, or the functionality thereof, may alternatively be part of, or implemented by, multiple distributed controllers or computing devices. For example, power management controller 402 may be a VCU or may be part of a VCU, or power management controller 402 may include one or more of a VCU, a BCM, a CTM, and/or other controllers in the electric vehicle 400.

In various embodiments, power management controller 402 includes processing circuit 404 and communications interface 420. Processing circuit 404 may include a processor 406 and memory 408. Processor 406 can be a general-purpose processor, an application-specific integrated circuit (ASIC), one or more field programmable gate arrays (FPGAs), a group of processing components (e.g., a central processing unit (CPU)), or other suitable electronic processing structures. In some implementations, processor 406 is configured to execute program code stored on memory 408 to cause controller 402 to perform one or more operations, as described below in greater detail. It will be appreciated that, in implementations where controller 402 is part of another computing device, the components of controller 402 may be shared with, or the same as, the host device. For example, if controller 402 is implemented via a VCU of vehicle 10 (e.g., that performs other vehicle control functions, etc.), then controller 402 may utilize the processing circuit, processor(s), and/or memory of the VCU to perform the functions described herein.

Memory 408 can include one or more devices (e.g., memory units, memory devices, storage devices, etc.) for storing data and/or computer code for completing and/or facilitating the various processes described in the present disclosure. In some implementations, memory 408 includes tangible (e.g., non-transitory), computer-readable media that stores code or instructions executable by processor 406. Tangible, computer-readable media refers to any physical media that is capable of providing data that causes controller 402 to operate in a particular fashion. Example tangible, computer-readable media may include, but is not limited to, volatile media, non-volatile media, removable media, and non-removable media implemented in any method or technology for storage of information such as computer-readable instructions, data structures, program modules, or other data. Accordingly, memory 408 can include random access memory (RAM), read-only memory (ROM), erasable programmable read-only memory (EPROM), electronically erasable programmable read-only memory (EEPROM), hard drive storage, temporary storage, non-volatile memory, flash memory, optical memory, or any other suitable memory for storing software objects and/or computer instructions. Memory 408 can include database components, object code components, script components, or any other type of information structure for supporting the various activities and information structures described in the present disclosure. Memory 408 can be communicably connected to processor 406, such as via processing circuit 404, and can include computer code for executing (e.g., by processor 406) one or more processes described herein. While shown as individual components, it will be appreciated that processor 406 and/or memory 408 can be implemented using a variety of different types and quantities of processors and memory. For example, processor 406 may represent a single processing device or multiple processing devices. Similarly, memory 408 may represent a single memory device or multiple memory devices. Additionally, in some implementations, power management controller 402 may be implemented within a single computing device (e.g., one module, one housing, etc.). In other implementations, power management controller 402 may be distributed across multiple computing devices (e.g., that can exist in distributed positions on electric vehicle 10). For example, as mentioned above, power management controller 402 may include multiple distributed computing devices (e.g., multiple processors and/or memory devices), such as a VCU, BCM, CTM, etc., in communication with each other, that collaborate to perform operations described herein.

Memory 408 may include charge balance manager 410 and/or GUI generator 418. Charge balance manager 410 may control the charging of battery system 434. For example, charge balance manager 410 may supply battery system 434 with a first amount of power from external energy supply 440 and a second amount of power from REX 458. In various embodiments, charge balance manger 410 controls the charging of battery system 434 by operating one or more components of electric vehicle 400, as described below. For example, charge balance manager 410 may transmit a control signal to battery management system 454 to cause battery management system 454 to route a specified amount of power from external energy supply 440 to battery system 434.

In various embodiments, charge balance manager 410 is configured to control, directly and/or indirectly, a plurality of subsystems of electric vehicle 400 (also referred to herein as "vehicle systems") according to various predefined and/or user-defined operating modes, as discussed in greater detail below. Directly controlling a vehicle subsystem, as described herein, generally refers to transmitting control signals to the vehicle subsystem, or components thereof, to affect operations of the vehicle subsystem or components thereof. In contrast, indirectly controlling a vehicle subsystem generally refers to transmitting data (e.g., instructions) or control signals to a separate controller or computing device associated with the vehicle subsystem, or components thereof, to cause the separate controller or computing device to affect operations of the vehicle subsystem or components thereof.

In some embodiments, charge balance manager 410 controls the operation of REX 458 based on one or more safety characteristics. For example, charge balance manager 410 may receive an ambient carbon monoxide measurement (e.g., from vehicle sensor(s) 430, etc.) and may control REX 458 based on the ambient carbon monoxide measurement exceeding a threshold (e.g., to turn off REX 458 to prevent a further buildup of carbon monoxide, etc.). As another example, charge balance manager 410 may receive location data (e.g., from positioning system 450, one or more cameras, one or more proximity sensors, etc.) and may control REX 458 in response to determining, based on the location data, that electric vehicle 400 is in an enclosed space (e.g., to turn off REX 458 to prevent a buildup of carbon monoxide, etc.). In some embodiments, charge balance manager 410 may operate REX 458 in response to a location trigger. For example, charge balance manager 410 may operate REX 458 when electric vehicle 400 is located within a threshold distance of a location indicated as "home" (e.g., to facilitate location-based charging of battery system 434, etc.). As another example, charge balance manager 410 may enable/disable dual source charging (e.g., charging battery system 434 using external energy supply 440 and REX 458) in response to determining that electric vehicle 400 is within a threshold distance of a location.

In some embodiments, charge balance manager 410 controls REX 458 according to a schedule. For example, charge balance manager 410 may receive a schedule (e.g., from a user, from an external source, etc.) and control REX 458 to only operate during a time period indicated by the schedule (e.g., from 9 AM to 5 PM, etc.).

In various embodiments, vehicle control system 400 provides a user with user-selectable options presented via an HMI 442 (e.g., such as via display(s) 444, which can be a touch display) of electric vehicle 10 or via a user interface of a remote device. In this manner, the user may be able to select function(s) and/or may enter inputs via the HMI (e.g., via input device(s) 446) and/or GUI in selecting an operating mode for the multi-source charging system 16. It is to be appreciated that user-selectable options may also be presented via a remote device (e.g., a user device such as a smartphone, etc.).

GUI generator 418 may generate GUIs to be presented via HMI 442. GUI generator 418 may generate a GUI that includes a menu of selectable options for controlling power management controller 402. In some implementations, GUI generator 418 generates alerts or notifications to be presented via HMI 442. Some example GUIs that can be generated by GUI generator 418 are shown in FIGS. 3A-3D, discussed herein. It should also be appreciated that certain GUIs generated by GUI generator 418 may be presented via the remote device (e.g., as opposed to via HMI 442) and/or the remote device may include a separate GUI generator for generating various GUIs described herein.

Communications interface 420 may facilitate communication (e.g., the exchange of data) between power management controller 402 and various other components or devices of electric vehicle 400, including any of the subsystems shown in FIG. 4. In addition, communications interface 420 may facilitate communications with any other devices that are external to electric vehicle 400. Accordingly, communications interface 420 can be or can include a wired or wireless communications interface (e.g., jacks, antennas, transmitters, receivers, transceivers, wire terminals, etc.) for conducting data communications, or can be or include any combination of wired and/or wireless communication interfaces. For example, communications interface 420 can include any combination of wireless transceivers (e.g., cellular transceivers, Wi-Fi transceivers, short-range radio transceivers, etc.) or wired transceivers (e.g., a fiber optic transceiver, a controller area network transceiver, etc.). In this regard, communications via communications interface 420 may be direct (e.g., local wired or wireless communications) or via a network (e.g., a CAN bus). It should be appreciated that communications interface 420 can also act as an input/output (I/O) interface for transmitting and receiving analog signals, e.g., from various sensors, as discussed below.

HMI 442 may include one or more display(s) 444 and/or one or more input device(s) 446. Display(s) 444 may be or include a device or component for presenting GUIs. For example, display(s) 444 may include a liquid crystal display (LCD), a light-emitting diode (LED) display, and/or the like, capable of presenting GUIs. Input device(s) 446 may receive user inputs. For example, input device(s) 446 may include a keypad, buttons, a microphone, a camera, and/or the like, which may be virtual (e.g., electronic digital representations), or physical input devices.

In some implementations, display(s) 444 and input device (s) 446, or the functionality thereof, may be combined into a single device, such as a touchscreen display. In some implementations, HMI 442 includes a touchscreen display in combination with one or more physical input devices, such as buttons, knobs, switches, etc. It should also be appreciated that, in some implementations, input device(s) 446 may represent a plurality of different input devices. For example, input device(s) 446 may include a touchscreen display and multiple physical buttons or switches positioned about the interior of electric vehicle 400.

Vehicle sensor(s) 430 may include one or more sensors for measuring/determining characteristics of electric vehicle 400 and/or its surroundings. For example, vehicle sensor(s) 430 may include air quality sensors, REX monitoring sensors, battery monitoring sensors, OBC monitoring sensors, body sensors, voltage/current sensors, and/or the like. In some embodiments, vehicle sensor(s) 430 include a carbon monoxide sensor to detect carbon monoxide, which can be used as an input to shut off or prevent operation of the internal combustion engine of the REX and/or re-balance the charging load so that the EVSE/OBC are providing all the charging power to the battery (e.g., in response to detecting an ambient carbon monoxide level that exceeds a threshold, etc.). In some embodiments, vehicle sensor(s) 430 include an REX monitoring sensor for monitoring a fuel consumption of the REX, which can be used to control operation of the REX (e.g., by throttling a power output of the REX in response to a fuel consumption exceeding a threshold, etc.). In various embodiments, vehicle sensor(s) 430 include one or more sensors to measure safety characteristics associated with the REX. For example, vehicle sensor(s) 430 may include a positioning system (e.g., GPS, etc.) to determine whether electric vehicle 400 is in an enclosed space, which can be used to shut off operation of the REX (e.g., to avoid an unsafe buildup in carbon monoxide, etc.).

In some embodiments, vehicle sensor(s) 430 include a battery monitoring sensor for monitoring a temperature of battery system 434, which can be used to control operation of battery system 434 (e.g., by reducing a charging current supplied to battery system 434 in response to a temperature of battery system 434 exceeding a threshold, etc.). In some embodiments, vehicle sensor(s) 430 include an OBC monitoring sensor to monitor a temperature of the OBC, which can be used to control an operation of the OBC (e.g., by turning off the OBC in response to a temperature of the OBC exceeding a threshold, etc.).

In some embodiments, vehicle sensor(s) 430 include body sensors such as an inertial measurement unit (IMU) for detecting a positioning (e.g., pitch, roll, yaw) and/or motion of electric vehicle 400, a GPS for determining a location and/or speed of electric vehicle 400, contact and/or airbag sensors for detecting contact with objects and/or deploying airbags, and more. Additionally or alternatively, vehicle sensor(s) 430 may include sensors or other feedback devices such as wheel speed sensors, voltage or current sensors (e.g., for monitoring energy provided from the external energy supply 440 to electric machines 436 of powertrain 432), sensors that determine a rotational speed and direction of electric machines 436, and/or the like. In some embodiments, vehicle sensor(s) 430 include components that are not sensing devices, per se. For example, vehicle sensor(s) 430 may include an inverter that provides feedback on voltage, current, motor speed and direction, etc., without directly measuring these variables using a dedicated sensor.

Positioning system 450 may be configured to determine a position of electric vehicle 400. For example, positioning system 450 may receive GPS data and determine a location of electric vehicle 400 based on the location data. As another example, positioning system 450 may receive one or more images and determine a location to electric vehicle 400 based on the one or more images (e.g., using feature recognition image processing, etc.). In some embodiment, positioning system 450 determines one or more characteristics of a surrounding of electric vehicle 400. For example, positioning system 450 may determine whether electric vehicle 400 is positioned within an enclosed space using image data and/or data from proximity sensors.

Powertrain 432 may be used to move electric vehicle 400 (e.g., by driving one or more wheels, etc.). Powertrain 432 may include battery system 434 and/or electric machines 436. Battery system 434 may be similar to or the same as battery system 22. Electric machines 436 may be similar to or the same as electric machines 18. In various embodiments, powertrain 432 includes additional and/or different components than shown in FIG. 4.

In various embodiments, ADAS 438 assists an operator in safely operating electric vehicle 400. For example, ADAS 438 may receive carbon monoxide measurements from vehicle sensor(s) 430 and alert a user to unsafe carbon monoxide levels based on the measurements. In various embodiments, ADAS 438 includes one or more sensors and/or subcomponents. For example, ADAS 438 may include a number of sensors for monitoring REX 458, battery system 434, and/or an environment of electric vehicle 400. In various embodiments, ADAS 438 monitors ambient air to ensure that REX 458 is operating safely. In various embodiments, EVCC 448 is similar to or the same as EVCC 210. In various embodiments, battery management system 454 is similar to or the same as PMC 58. In various embodiments, REX 458 is similar to or the same as REX 46.

Figure 5:
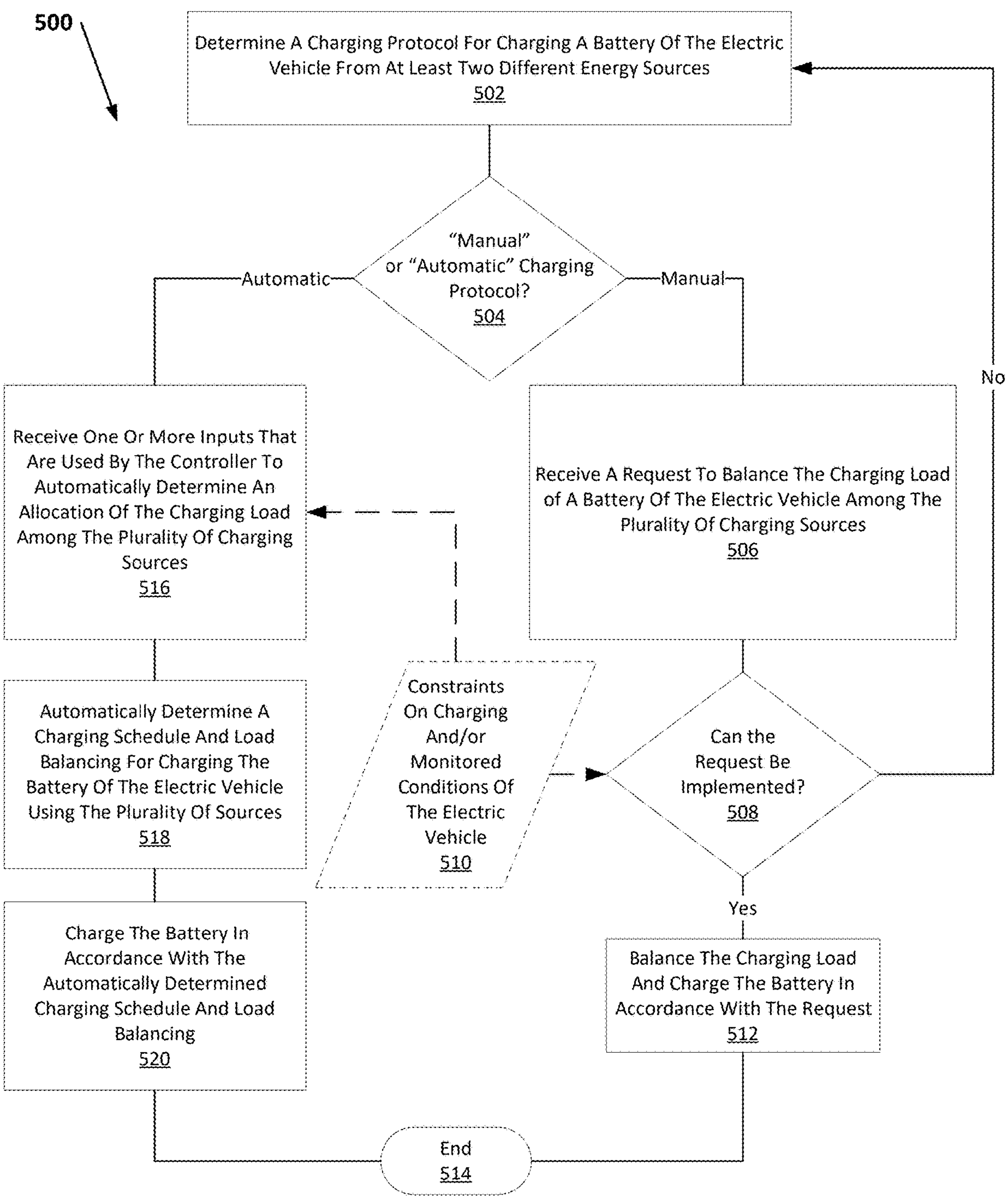
FIG. 5 illustrates a flow chart of a process for manually or automatically controlling charging a battery of an electric vehicle comprising a multi-source charging system, according to some implementations.

Referring now to FIG. 5, a flow chart of a process 500 for manually or automatically controlling charging a battery of an electric vehicle comprising a multi-source charging system is shown, according to some implementations. In various embodiments, electric vehicle 400, or a component thereof, performs process 500. For example, power management controller 402 may perform process 500. As another example, certain steps of process 500 may be implemented via HMI 442. In some embodiments, process 500, or portions thereof, may be performed by a computing device that is external to electric vehicle 10. For example, in some implementations, process 500 may be at least partially implemented via a personal computing device (e.g., a smartphone) of a user, such as the owner or operator of electric vehicle 10. It should also be appreciated that certain steps of process 500 may be optional and, in some implementations, process 500 may be implemented using less than all of the steps. It should be understood that the order of steps shown in FIG. 5 is not intended to be limiting.

At step 502, the electric vehicle determines a charging protocol for charging a battery of the electric vehicle from at least two different energy sources. In some embodiments, the at least two different energy sources include an REX and an external energy supply. In some embodiments, the protocol is a "manual" protocol (e.g., determined based on user input). Additionally or alternatively, the protocol can be an "automatic" protocol (e.g., determined without user input). As described above, user input may be received via HMI 442 (e.g., a touchscreen display of electric vehicle 400, such as an infotainment unit) or, in some implementations, via a user interface of a remote device (e.g., a smartphone). In some embodiments, the electric vehicle has a default charging protocol. For example, the default charging protocol may be "automatic" and an algorithm executed by a controller (such as power management controller 402), based upon monitored conditions and/or constraints of the electric vehicle (such as whether it is connected to the EVSE, fuel availability in the fuel tank of the REX, maximum power of the EVSE, etc.) will determine allocation of the charging load between the REX and the EVSE (through the charge inlet connector and the OBC).

If, at 504, the selected option is "manual," then the process goes to 506, where a request to balance the charging load of a battery of the electric vehicle comprising a multi-source charging system between a plurality of charging sources of the multi-source charging system is received. In various embodiments, the request includes serving a GUI to a user that facilitates receiving a user input to define a relative allocation of power used to charge a battery of the electric vehicle (e.g., what portion of power used to charge the battery is supplied by an REX and what portion of power used to charge the battery is supplied by an external energy supply, etc.). As with the above, the request may be provided by a user via HMI 442 (e.g., a touchscreen display of vehicle 10, such as an infotainment unit) or, in some implementations, via a user interface of the remote device (e.g., a smartphone). For example, the user may be presented via a GUI that facilitates the selection of an operating mode of the multisource charging system and may select a graphical element of the GUI (e.g., a slider, a button, etc.) to initiate the manual balancing of the charging sources for charging the battery of the electric vehicle. Optionally or alternatively, the user input may be provided via a physical input device such as a button (or buttons), rotatable knob, physical slider, and the like.

At 508, it is determined whether the battery of the electric vehicle can be charged in accordance with the indication of the request, based upon monitored conditions and/or constraints of the electric vehicle (such as whether it is connected to the EVSE, fuel availability in the fuel tank of the REX, maximum power of the EVSE, etc.) 510. If, at 508, the electric vehicle cannot be charged in accordance with the first user input, then the process returns to step 502. In some instances, information may be provided to the user as to why the electric vehicle cannot be charged in accordance with the first user input. Otherwise, if at 508 it is determined that the battery of the electric vehicle can be charged in accordance with the request, based upon monitored conditions and/or constraints of the electric vehicle 510, the process goes to 512 where the controller controls the plurality of sources (e.g., the first source and the second source) to charge the battery in accordance with the request. In some embodiments, controlling the plurality of sources includes controlling the sources directly (e.g., by sending a signal to the REX to throttle the REX to 50% of its maximum output power, etc.). Additionally or alternatively, controlling the plurality of sources may include controlling the sources indirectly (e.g., by receiving an input power from each of the plurality of sources and determining what portion of an output power used to charge the battery is supplied by each of the plurality of sources, etc.). The process then ends at 514.

Returning to step 504, if, at 504, the selection is "automatic," then the process goes to 516, where the user provides one or more inputs that are used by the controller, based upon constraints and/or monitored conditions of the electric vehicle (such as whether it is connected to the EVSE, fuel availability in the fuel tank of the REX, maximum power of the EVSE, etc.) 510 to determine allocation of the charging load between the plurality of sources (e.g. the REX and the EVSE (through the charge inlet connector and the OBC)) for charging the battery of the EV. In some instances, selectable options are presented to the user via the GUI and the inputs are based on the user's selection. Selectable user inputs may include, for example, a selection to charge the vehicle as quickly as possible (e.g., "rapid charge"); an input related to a destination for the vehicle (the controller determines an optimal charging schedule for the battery 206 so that the vehicle will have the range to travel to the destination (and optionally, back from the destination to a "home" location)); a time to achieve the desired charging of the battery 206 (for example, a user input may be that the user wants the battery 206 100% charged by 6:00 am the following morning); time of day/cost-based charging thresholds; fuel consumption target usage of the ICE of the REX 214 and fuel reserves (for example, the input can indicate that the user does not want to have less than a half of a tank of fuel when the charging of the battery 206 is complete or the desired level of charge is achieved), and the like. For example, the electric vehicle may retrieve electrical demand information (e.g., a current energy price, etc.) based on a current location of the electric vehicle. As another example, the electric vehicle may retrieve historical electrical demand information and determine an 8-hour period for charging battery 206 that minimizes an energy cost.

At 518, the one or more processors of the controller execute instructions to determine a charging schedule and load balancing for charging the battery of the electric vehicle using the plurality of sources (e.g., the REX and the EVSE/OBC) of the multi-source charging system based on the received inputs and considering constraints and monitored conditions 510 of the electric vehicle (such as whether it is connected to the EVSE, fuel availability in the fuel tank of the REX, maximum power of the EVSE, etc.). In some embodiments, the controller determines a maximum amount of power that can be received from the EVSE (e.g., by querying a controller of the EVSE, by measuring a voltage and/or current supplied by the EVSE, etc.). In some embodiments, determining the load balance includes (i) estimating an amount of energy needed to charge battery 206, (ii) determining a maximum power output of the EVSE, and/or (iii) determining a required output from the REX based on the amount of energy needed to charge the battery 206 and/or the maximum power output of the EVSE (e.g., such that the REX supplies any power needed to charge the battery 206 that is beyond the maximum power output of the EVSE, etc.). In some embodiments, determining the load balance for charging the battery of the electric vehicle includes providing to a user (e.g., via an HMI, etc.) a default charging amount (e.g., 10 kW, etc.) that is split between a first source (e.g., the EVSE, etc.) and a second source (e.g., the REX, etc.). In some embodiments, the load balance is determined based on a charger category. For example, the controller may provide a first default load balance in response to detecting an L1 EVSE and may provide a second default load balance in response to detecting an L2 EVSE. In some embodiments, the default charging amount is determined based on a maximum power available (e.g., a combined power available via the REX and EVSE, etc.).

At 520, the battery of the electric vehicle is charged in accordance with the determined charging schedule and load balancing for charging the battery. The process ends at 514.

CONCLUSION

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

For the purposes of this description, certain advantages and novel features of the aspects and configurations of this disclosure are described herein. The described methods, systems, and apparatus should not be construed as limiting in any way. Instead, the present disclosure is directed toward all novel and nonobvious features and aspects of the various disclosed aspects, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present, or problems be solved.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Features disclosed in this specification (including any accompanying claims, abstract, and drawings), and/or all of the steps of any method or process so disclosed, may be combined in any combination, except combinations where at least some of such features and/or steps are mutually exclusive. The claimed features extend to any novel one, or any novel combination, of the features disclosed in this specification (including any accompanying claims, abstract, and drawings), or to any novel one, or any novel combination, of the steps of any method or process so disclosed.

As used in the specification and the appended claims, the singular forms "a", "an", and "the" include plural referents unless the context clearly dictates otherwise. Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about", it will be understood that the particular value forms another aspect. It will be further understood that the endpoints of each of the ranges are significant both in relation to the other endpoint, and independently of the other endpoint. The terms "about" and "approximately" are defined as being "close to" as understood by one of ordinary skill in the art. In one non-limiting aspect the terms are defined to be within 10%. In another non-limiting aspect, the terms are defined to be within 5%. In still another non-limiting aspect, the terms are defined to be within 1%.

The terms "coupled", "connected", and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

Certain terminology is used in the following description for convenience only and is not limiting. The words "right", "left", "lower", and "upper" designate direction in the drawings to which reference is made. The words "inner" and "outer" refer to directions toward and away from, respectively, the geometric center of the described feature or device. The words "distal" and "proximal" refer to directions taken in context of the item described and, with regard to the instruments herein described, are typically based on the perspective of the practitioner using such instrument, with "proximal" indicating a position closer to the practitioner and "distal" indicating a position further from the practitioner. The terminology includes the above-listed words, derivatives thereof, and words of similar import.

Throughout the description and claims of this specification, the word "comprise" and variations of the word, such as "comprising" and "comprises", means "including but not limited to", and is not intended to exclude, for example, other additives, components, integers or steps. "Exemplary" means "an example of" and is not intended to convey an indication of a preferred or ideal aspect. "Such as" is not used in a restrictive sense, but for explanatory purposes.

The corresponding structures, materials, acts, and equivalents of all means or step plus function elements in the claims below are intended to include any structure, material, or act for performing the function in combination with other claimed elements as specifically claimed. The present disclosure is provided for the purposes of illustration and description but is not intended to be exhaustive or limited to the form disclosed. Many modifications and variations will be apparent to those of ordinary skill in the art without departing from the scope and spirit of the present disclosure.

What is claimed is:

1. A multi-source charging system for an electric vehicle, said system comprising:

an electric prime mover configured to drive a wheel of the electric vehicle;

a battery electrically connected to the electric prime mover and configured to receive DC electrical power for charging the battery;

an on-board charger electrically connected to the battery and configured to supply first DC electrical power for charging the battery;

a range extender electrically connected to the battery and configured to supply second DC electrical power to charge the battery; and a controller comprising a processor and memory, the memory having instructions stored thereon that, when executed by the processor, cause the controller to:

determine a power allocation for charging the battery, wherein the power allocation comprises a portion of the first DC electrical power and a portion of the second DC electrical power; and operate the on-board charger and the range extender, based on the determined power allocation, to cause the on-board charger and the range extender to simultaneously provide power to charge the battery when the electric prime mover is not driving the wheel.

2. The multi-source charging system of claim 1, wherein the range extender comprises an internal combustion engine and an electrical generator.

3. The multi-source charging system of claim 2, wherein the electrical generator is a DC electrical generator, and wherein the DC electrical generator generates the second DC electrical power for charging the battery.

4. The multi-source charging system of claim 2, wherein the electrical generator is an AC electrical generator, and wherein the range extender further comprises an electrical converter configured to convert AC power generated by the AC electrical generator into the second DC electrical power for charging the battery.

5. The multi-source charging system of claim 1, wherein the instructions further cause the controller to receive user input corresponding to a desired power allocation; and wherein determining the power allocation comprises setting the power allocation to the desired power allocation.

6. The multi-source charging system of claim 5, wherein the user input is received from either (i) a smartphone or (ii) a display integrated into the electric vehicle.

7. The multi-source charging system of claim 1, further comprising a display configured to present a graphical user interface (GUI) to a user and receive input therefrom, and wherein the instructions further cause the controller to cause the display to display the GUI comprising a slider for selecting a desired power allocation.

8. An electric vehicle comprising:

a wheel;

an electric prime mover configured to drive the wheel;

a battery electrically connected to the electric prime mover and configured to receive DC electrical power for charging the battery;

an on-board charger electrically connected to the battery and configured to supply first DC electrical power for charging the battery;

a range extender electrically connected to the battery and configured to supply second DC electrical power for charging the battery;

a display configured to display a graphical user interface (GUI) for selecting a desired power allocation; and a controller comprising a processor and memory, the memory having instructions stored thereon that, when executed by the processor, cause the controller to:

receive context data;

determine a power allocation for charging the battery based on the context data and the desired power allocation, wherein the power allocation comprises a portion of the first DC electrical power and a portion of the second DC electrical power; and operate the on-board charger and the range extender, based on the determined power allocation, to cause the on-board charger and the range extender to simultaneously provide power to charge the battery when the electric prime mover is not driving the wheel.

9. The electric vehicle of claim 8, wherein the range extender comprises an internal combustion engine and an electrical generator.

10. The electric vehicle of claim 9, wherein the electrical generator is a DC electrical generator, and wherein the DC electrical generator generates the second DC electrical power for charging the battery.

11. The electric vehicle of claim 9, wherein the electrical generator is an AC electrical generator, and wherein the range extender further comprises an electrical converter configured to convert AC power generated by the AC electrical generator into the second DC electrical power for charging the battery.

12. The electric vehicle of claim 8, wherein the GUI comprises a slider for selecting the desired power allocation.

13. The electric vehicle of claim 8, wherein the context data comprises a charging capacity of an electric vehicle charger external to the electric vehicle.

14. The electric vehicle of claim 13, wherein the context data comprises information describing a price of electricity sourced from the electric vehicle charger.

15. The electric vehicle of claim 8, wherein the context data comprises information describing a physical location of the electric vehicle.

16. The electric vehicle of claim 15, wherein the instructions further cause the controller to determine, based on the information describing the physical location of the electric vehicle, whether the range extender can be safely operated.

17. The electric vehicle of claim 15, wherein the information describing the physical location of the electric vehicle comprises at least one of (i) global positioning system (GPS) data or (ii) proximity sensor data.

18. A power management controller for an electric vehicle, the power management controller comprising a processing circuit comprising a processor and memory, the memory having instructions stored thereon that, when executed by the processor, cause the power management controller to:

determine whether an external power source is connected to the electric vehicle;

determine a current charge level of a battery of the electric vehicle;

cause a display to display a graphical user interface (GUI) comprising (i) a slider for selecting a desired power allocation and (ii) an indication of the current charge level;

receive context data;

determine, based on the desired power allocation and the context data, a power allocation for charging the battery; and operate an on-board charger of the electric vehicle and a range extender of the electric vehicle, based on the determined power allocation, to cause the on-board charger and the range extender to simultaneously provide power to charge the battery.

19. The power management controller of claim 18, wherein the context data comprises at least one of (i) information describing a price of electricity sourced from the external power source, (ii) information describing a charging capacity of the external power source, or (iii) information describing a physical location of the electric vehicle.

20. The power management controller of claim 19, wherein the instructions further cause the power management controller to determine, based on the information describing the physical location of the electric vehicle, whether the range extender can be safely operated.

* * * * *